US012791971B2

(12) United States Patent
Kuroki

(10) Patent No.: US 12,791,971 B2
(45) Date of Patent: Nov. 10, 2026

(54) STATIC ELIMINATION APPARATUS AND IMAGE FORMING SYSTEM

(71) Applicant: CANON KABUSHIKI KAISHA, Tokyo (JP)

(72) Inventor: Kenji Kuroki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/419,635

(22) Filed: Dec. 15, 2025

(65) Prior Publication Data

US 2026/0169412 A1 Jun. 18, 2026

(30) Foreign Application Priority Data

Dec. 17, 2024 (JP) ................................ 2024-220511

(51) Int. Cl.
*G03G 15/00* (2006.01)
*B65H 37/00* (2006.01)
*G03G 21/20* (2006.01)

(52) U.S. Cl.
CPC ............ *G03G 15/55* (2013.01); *B65H 37/00* (2013.01); *G03G 15/5004* (2013.01); *G03G 15/6573* (2013.01); *G03G 21/20* (2013.01); *B65H 2301/5133* (2013.01); *G03G 2215/00417* (2013.01)

(58) Field of Classification Search
None
See application file for complete search history.

(56) References Cited

U.S. PATENT DOCUMENTS 12,405,560 B2 9/2025 Masaki et al.
2007/0057937 A1* 3/2007 Lee .................... H04N 1/00408 345/211
2009/0010661 A1* 1/2009 Hamaya ............. G03G 15/0283 399/37
2018/0373182 A1* 12/2018 Mandai .................. G03G 21/14
2024/0255883 A1* 8/2024 Iwami ................ G03G 15/6573
2024/0280929 A1* 8/2024 Kaku ................... G03G 15/205
2025/0076807 A1* 3/2025 Okada ................ G03G 15/5079
2026/0169420 A1* 6/2026 Kobayashi ......... G03G 15/6573

FOREIGN PATENT DOCUMENTS

JP 2024107617 A 8/2024

* cited by examiner

*Primary Examiner* — Sevan A Aydin
(74) *Attorney, Agent, or Firm* — Canon U.S.A., Inc. IP Division

(57) ABSTRACT

A static elimination apparatus is configured to be connected to an image forming apparatus including an image forming unit that forms an image on a sheet. The static elimination apparatus includes a non-contact static elimination unit and a control unit. The non-contact static elimination unit includes an electrode portion that generates ions to perform non-contact static-electricity elimination on the sheet bearing an image formed by the image forming unit. The control unit performs a detection process for detecting whether maintenance of the electrode portion is needed in response to an instruction to transition the image forming apparatus from a first state to a second state in which power consumption is lower than in the first state.

14 Claims, 10 Drawing Sheets

STATIC ELIMINATION APPARATUS AND IMAGE FORMING SYSTEM

BACKGROUND

Field of the Technology

The present disclosure relates to a static elimination apparatus and an image forming system.

Description of the Related Art

In image forming apparatuses that form an image on a sheet, a sheet is electrostatically charged during image formation, which may cause ejected sheets to adhere to one another and result in improper stacking. Accordingly, an image forming system has been developed that includes a non-contact static elimination unit for eliminating static electricity on a sheet without contacting the sheet. When a non-contact static elimination unit is continuously used, dust and organic substances in the air may be deposited on an electrode portion of the non-contact static elimination unit, resulting in a decrease in the static elimination performance of the non-contact static elimination unit. Therefore, it is desirable that maintenance be performed on the electrode portion at appropriate times. According to Japanese Patent Laid-Open No. 2024-107617, when the number of sheets on which static electricity has been eliminated by a non-contact static elimination unit reaches a predetermined threshold value, a detection process is performed to detect whether maintenance of an electrode portion is needed.

However, when maintenance of the electrode portion is needed, the user needs to interrupt the printing operation to perform maintenance on an electrode portion, which reduces the efficiency of the printing operation.

SUMMARY

Accordingly, embodiments of the present disclosure provide a static elimination apparatus and an image forming system that reduce the frequency of interruptions to a printing operation caused by maintenance of a non-contact static elimination unit.

According to an aspect of the present disclosure, a static elimination apparatus, configured to be connected to an image forming apparatus that includes an image forming unit configured to form an image on a sheet, includes a non-contact static elimination unit including an electrode portion configured to generate ions, wherein the non-contact static elimination unit is configured to perform non-contact static-electricity elimination on the sheet bearing an image formed by the image forming unit, and a control unit configured to perform a detection process for detecting whether maintenance of the electrode portion is needed, wherein the control unit performs the detection process in response to an instruction to transition the image forming apparatus from a first state to a second state in which power consumption is lower than in the first state.

According to another aspect of the present disclosure, an image forming system includes an image forming unit configured to form an image on a sheet, a non-contact static elimination unit that includes an electrode portion configured to generate ions, wherein the non-contact static elimination unit is configured to perform non-contact static-electricity elimination on the sheet bearing an image formed by the image forming unit, and a control unit configured to perform a detection process for detecting whether maintenance of the electrode portion is needed, wherein the control unit performs the detection process in response to an instruction to transition the image forming apparatus from a first state to a second state in which power consumption is lower than in the first state.

Features of various embodiments of the present disclosure will become apparent from the following description of embodiments with reference to the attached drawings. The following description of embodiments is described by way of example.

DESCRIPTION OF THE EMBODIMENTS

Figure 1:
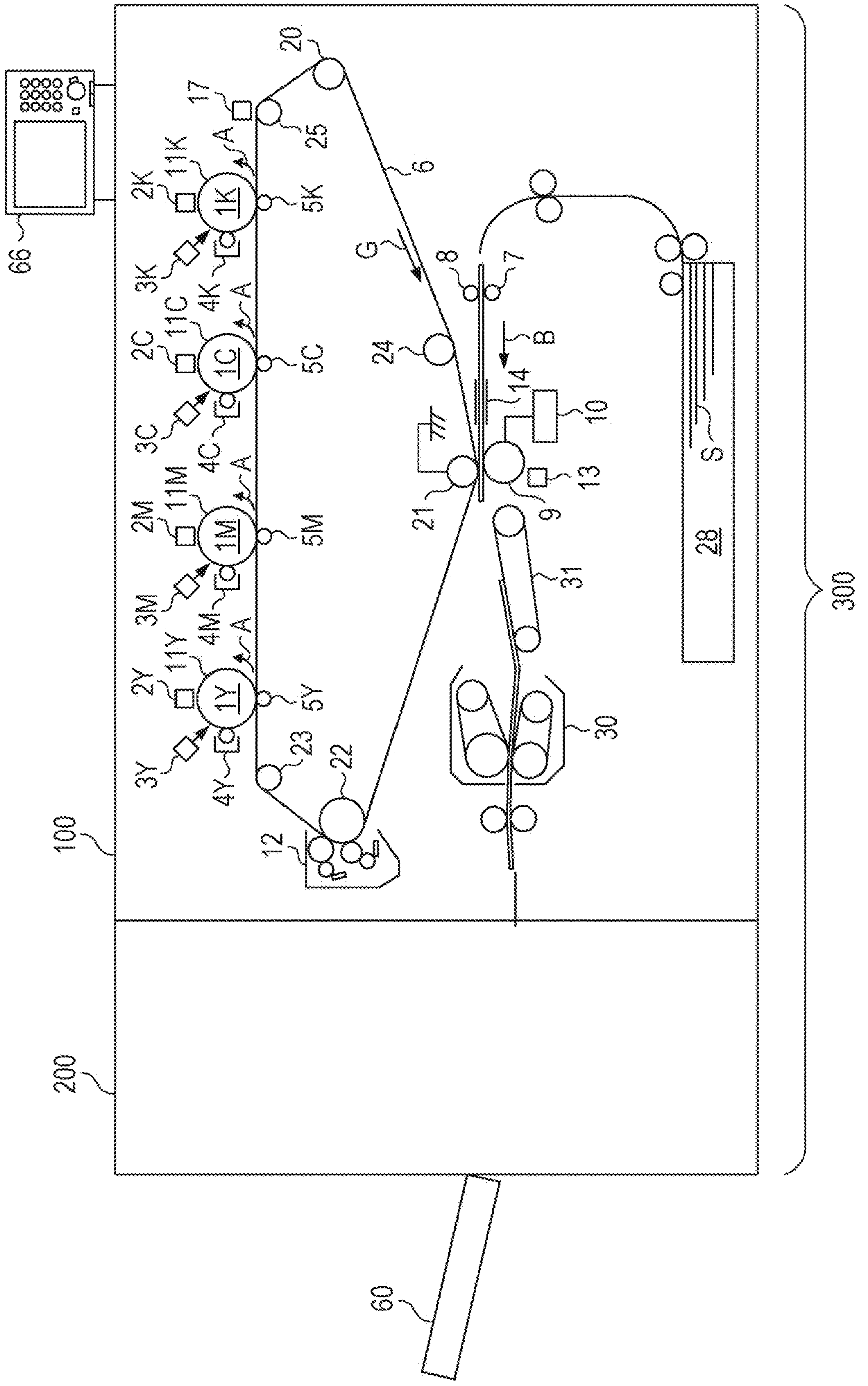
FIG. 1 is a schematic illustration of an image forming system.

Embodiments of the present disclosure are described below with reference to the accompanying drawings. It should be noted that the dimensions, materials, relative positions, and the like of the constituent elements of an image forming apparatus and a static elimination apparatus are not intended to limit the scope of the present disclosure unless otherwise specified. In the drawings, the constituent elements identified by the same reference numerals have the same configuration or operation, and duplicate descriptions of the constituent elements are omitted as appropriate.

First Embodiment

Structural Overview of Image Forming Apparatus

FIG. 1 is a configuration diagram of an image forming system 300 according to the first embodiment. The image forming system 300 includes an image forming apparatus 100 that forms an image on a sheet S and a static elimination apparatus 200 that eliminates electric charge on a sheet surface. The details of the static elimination apparatus 200 are not illustrated in the schematic diagram of the image forming system 300 illustrated in FIG. 1. The configuration of the static elimination apparatus 200 is described below (refer to FIG. 2).

A schematic configuration of the image forming apparatus 100 will now be described. The image forming apparatus 100 forms an image on the sheet S using an electrophotographic process. The image forming apparatus 100 includes a plurality of image forming units, that is, four image forming units 11Y, 11M, 11C, and 11K that form yellow (Y), magenta (M), cyan (C), and black (K) images, respectively. The image forming units 11Y, 11M, 11C, and 11K are arranged in a row along the movement direction of the image transfer surface, which is disposed substantially horizontally on intermediate transfer belt 6 (described below). The image forming unit 11 includes a photoconductive drum 1 (1Y, 1M, 1C, 1K), a charging device 2 (2Y, 2M, 2C, 2K), an exposure device 3 (3Y, 3M, 3C, 3K), a development device 4 (4Y, 4M, 4C, 4K), and a primary transfer roller 5 (5Y, 5M, 5C, 5K).

As illustrated in FIG. 1, the photoconductive drums (latent image bearing members) 1Y, 1M, 1C, and 1K rotate in the directions of arrows A. The surfaces of photoconductive drums 1Y, 1M, 1C, and 1K are uniformly charged by the charging devices 2Y, 2M, 2C, and 2K, respectively. The exposure devices 3Y, 3M, 3C, and 3K perform an exposure operation based on image information to form electrostatic latent images on the surfaces of the photoconductive drums 1Y, 1M, 1C, and 1K, respectively. The development devices 4Y, 4M, 4C, and 4K contain toner of yellow (Y), magenta (M), cyan (C), and black (K) colors, respectively. The development devices 4Y, 4M, 4C, and 4K develop the electrostatic latent images with their respective toners, thus forming toner images on the surfaces of the photoconductive drums 1Y, 1M, 1C, and 1K.

According to the present embodiment, the image forming apparatus 100 employs a reversal developing method that causes toner to adhere to an exposure portion of the electrostatic latent image.

The intermediate transfer belt 6 is disposed in contact with the surfaces of the photoconductive drums 1Y, 1M, 1C, and 1K. The intermediate transfer belt 6 is tensioned by a plurality of tension rollers 20, 21, 22, 23, 24, and 25 and rotates at a rotational speed of 150 mm/sec to 470 mm/sec in the direction of arrow G. According to the present embodiment, the tension roller 20 controls the tensile force of the intermediate transfer belt 6 to a constant level. The tension roller 22 serves as a drive roller for the intermediate transfer belt 6. The tension roller 21 is an inner roller for secondary transfer. An outer roller 9 for secondary transfer and the intermediate transfer belt 6 form a secondary transfer nip (a secondary transfer portion), through which the sheet S is nipped and conveyed.

The primary transfer rollers 5Y, 5M, 5C, and 5K are disposed facing the photoconductive drums 1Y, 1M, 1C, and 1K via the intermediate transfer belt 6 to form primary transfer nips (primary transfer portions) with the photoconductive drums 1Y, 1M, 1C, and 1K, respectively. A transfer bias having a polarity opposite to that of the toner image and regulated to a constant voltage is applied to the primary transfer rollers 5Y, 5M, 5C, and 5K in synchronization with the conveyance of color toner images on the surfaces of photoconductive drums 1Y, 1M, 1C, and 1K to the primary transfer nip portions, respectively. This causes the toner images on the photoconductive drums 1Y, 1M, 1C, and 1K to be transferred onto the intermediate transfer belt 6 (primary transfer).

A belt surface reading sensor 17 is provided in the vicinity of the intermediate transfer belt 6. The belt surface reading sensor 17 reads the image transferred onto the intermediate transfer belt 6. The belt surface reading sensor 17 is, for example, an optical sensor, which emits light onto the image on the intermediate transfer belt 6 and reads the image by receiving the reflected light. For example, the belt surface reading sensor 17 reads an adjustment image formed on the intermediate transfer belt 6 to adjust image forming conditions. An image formation CPU 61 (described below) analyzes the result of reading the adjustment image by the belt surface reading sensor 17, feeds back the result to the image forming conditions, and performs calibration.

The sheet S stored in a cassette 28 is conveyed by a sheet feed roller and the like to the registration roller 8, where the sheet S is temporarily stopped. Thereafter, the registration roller 8 conveys the sheet S to the secondary transfer portion in synchronization with conveyance of the toner image on the intermediate transfer belt 6 to the secondary transfer nip. A pre-secondary transfer conveyance guide 14 contributes to accurate conveyance of the sheet S to the secondary transfer portion.

The high-voltage application unit 10 applies, to the outer roller 9 for secondary transfer, a transfer bias having a polarity opposite to that of the toner image and regulated to a constant voltage. Thus, the toner image on the intermediate transfer belt 6 is transferred to the sheet S (secondary transfer). According to the present embodiment, the toner has negative polarity, so that a positive voltage is applied to the outer roller 9 for secondary transfer. The tension roller 21, which is an inner roller for secondary transfer, is electrically grounded. However, the high-voltage application unit 10 may apply a transfer bias having a polarity the same as that of the toner and regulated to a constant voltage to the tension roller 21, which is the inner roller for secondary transfer, while the outer roller 9 for secondary transfer is electrically grounded.

In a pre-fixing conveyance device 31, a belt member is rotating, and the sheet S having the toner image transferred thereto is placed on the belt member and is conveyed. The fixing device 30 heats and pressurizes the sheet S to fix the toner image onto the sheet S. The belt cleaning device 12 electrostatically collects and cleans the secondary transfer residual toner remaining on the intermediate transfer belt 6 without being transferred to the sheet S. The cleaned intermediate transfer belt 6 is used repeatedly for image formation.

An image formation display unit 66 is disposed on the cover of the image forming system 300. The image formation display unit 66 may be directly fixed to the cover. Alternatively, the image formation display unit 66 may be connected to the apparatus by a cable and be placed on top of the apparatus. The image formation display unit 66 may perform wireless communication by using Bluetooth (registered trademark) without being connected to the apparatus main body by a cable.

Structural Overview of Static Elimination Apparatus

Figure 2:
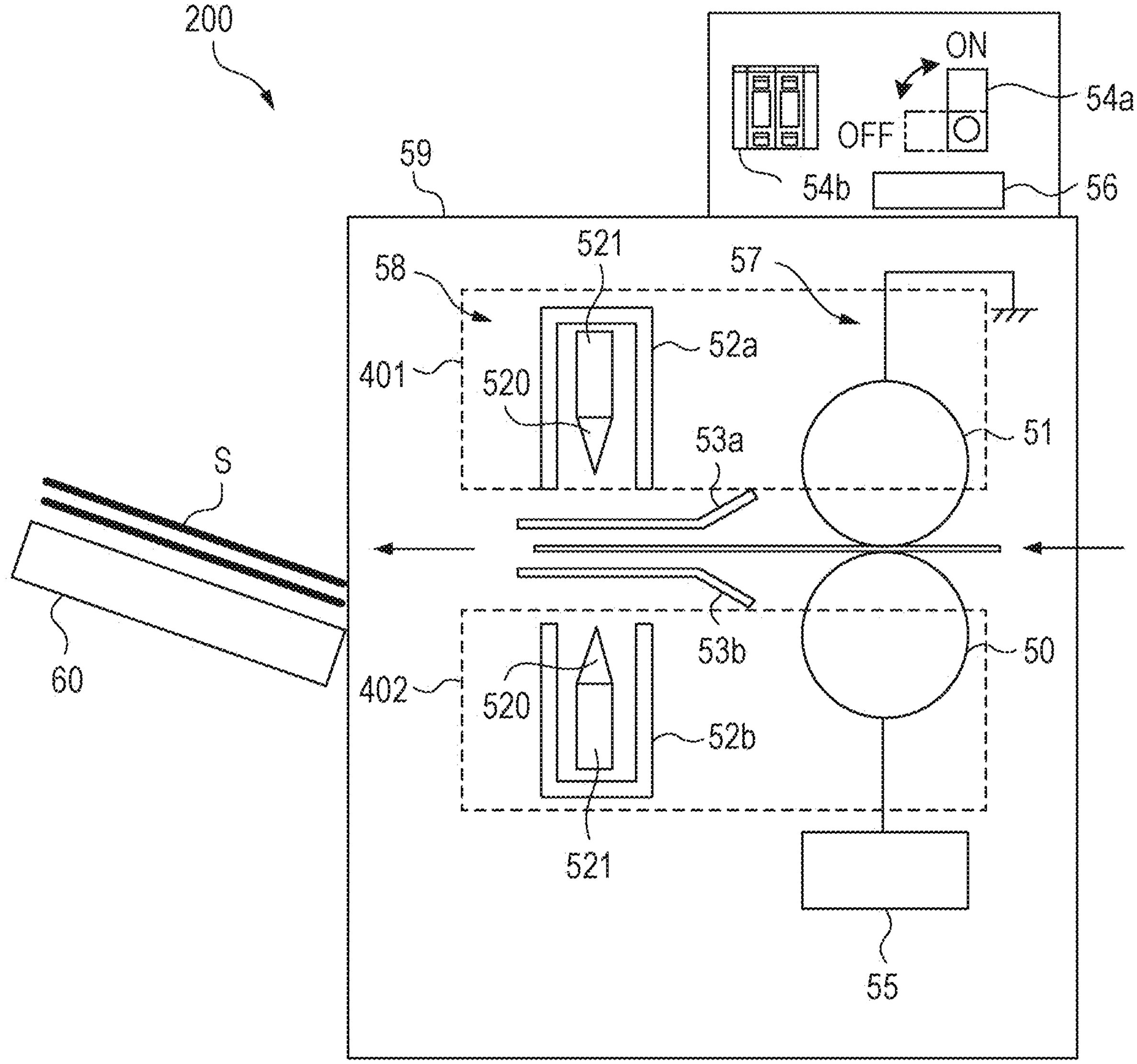
FIG. 2 is a schematic illustration of a static elimination apparatus.
Figure 3:
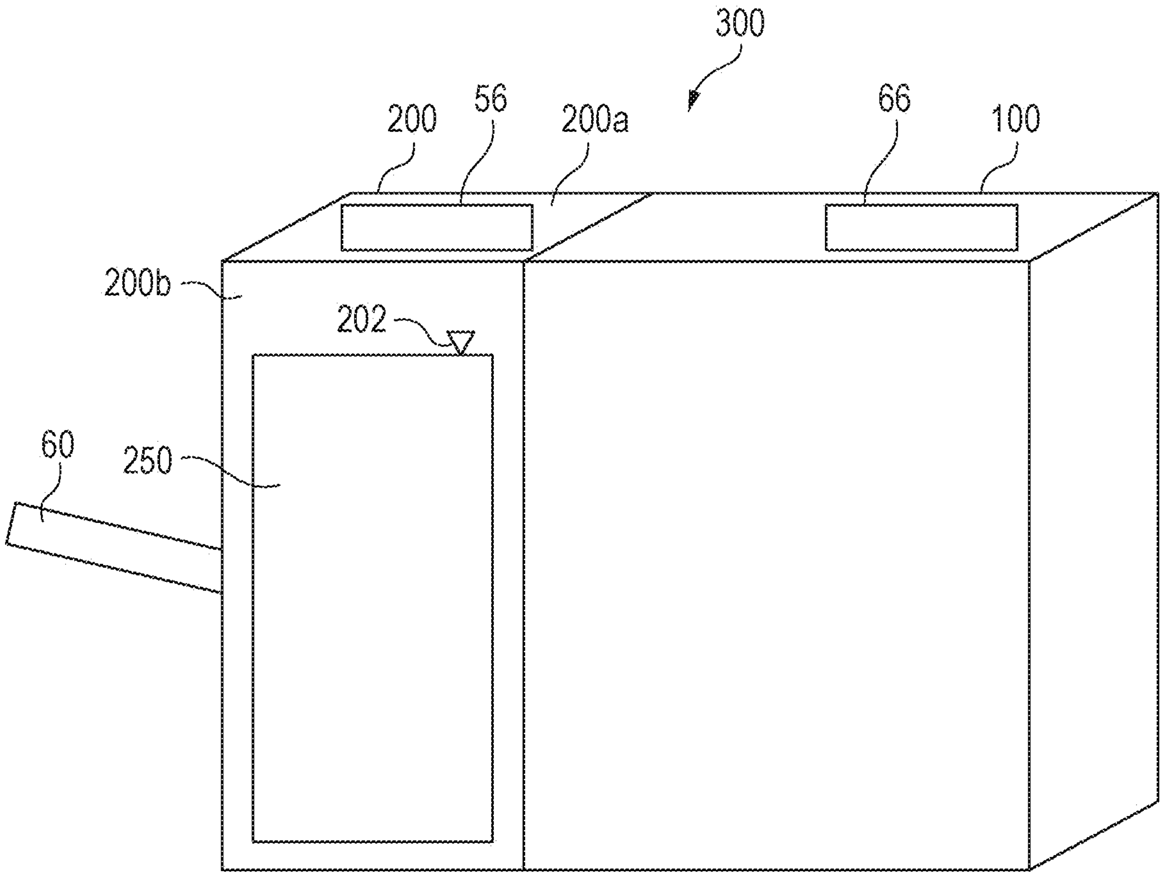
FIG. 3 illustrates the image forming system.

FIG. 2 illustrates the structural overview of the static elimination apparatus 200. FIG. 3 illustrates the image forming system 300. The static elimination apparatus 200 is disposed downstream of the image forming apparatus 100 in the sheet conveyance direction. In the secondary transfer described above, a high positive voltage is applied to the outer roller 9 for the secondary transfer (refer to FIG. 1). Therefore, the lower surface of the sheet S that has passed through the secondary transfer portion is positively charged, and the upper surface of the sheet S is negatively charged due to dielectric polarization. Therefore, if sheets S are stacked on a discharge tray 60 without undergoing static elimination, the contact surfaces of the stacked sheets may have different polarities, and the sheets may stick to each other due to an electrostatic force. To prevent sheets from sticking to each other due to an electrostatic force, the static elimination apparatus 200 according to the present embodiment eliminates electric charge on the sheet surfaces (upper and lower surfaces) using both a contact static elimination unit 57 and a non-contact static elimination unit 58.

The static elimination apparatus 200 may be connected directly to the image forming apparatus 100 or may be connected to the image forming apparatus 100 via an inserter or other sheet processing device. The image forming apparatus 100 and the static elimination apparatus 200 may be integrated into a single apparatus to form the image forming apparatus 100. Alternatively, the image forming apparatus 100 and the static elimination apparatus 200 may be integrated into a single apparatus to form the static elimination apparatus 200. That is, the image forming apparatus 100 and the static elimination apparatus 200 may have the same housing or may have a plurality of separate housings.

The static elimination apparatus 200 includes a housing 59, the contact static elimination unit 57, the non-contact static elimination unit 58, a conveyance guide 53, and a control unit (not illustrated) that performs overall control of the static elimination apparatus 200. The static elimination apparatus 200 further includes a static elimination operation unit 54 and a static elimination display unit 56. The residual charge on the sheet S conveyed from the image forming apparatus 100 is partially eliminated by the contact static elimination unit 57 that is in contact with the sheet S and eliminates static electricity. Subsequently, the residual charge, which is not removed by the contact static elimination unit 57, is eliminated by the non-contact static elimination unit 58 that is not in contact with the sheet S and eliminates static electricity. Thereafter, the sheet S is output to the outside of the static elimination apparatus 200. The contact static elimination unit 57, the non-contact static elimination unit 58, and the static elimination operation unit 54 are described in detail below.

The static elimination display unit 56 includes a light-emitting diode (LED) and is disposed on a top surface 200*a* (the upper surface of the apparatus) of a cover that covers the housing 59, as illustrated in FIG. 3. The static elimination display unit 56 may be provided on a front surface 200*b* (the front surface of the apparatus) of the cover of the static elimination apparatus 200. The front surface 200*b* is the surface of the static elimination apparatus 200 that faces forward from the apparatus, and the front surface 200*b* may be a sloped surface that is inclined to intersect with the vertical direction. Since the static elimination display unit 56 is disposed on the top surface 200*a* or the front surface 200*b* of the cover of the static elimination apparatus 200, the user can view the displayed information during use of the static elimination apparatus 200. That is, the static elimination display unit 56 needs to be disposed on the outer side of the cover. For example, the static elimination display unit 56 may be directly fixed to the cover or may be connected to the apparatus by a cable and is placed on top of the apparatus. Alternatively, the static elimination display unit 56 may perform wireless communication by using Bluetooth without being connected to the apparatus main body by a cable. The LED of the static elimination display unit 56 switches between an on state and an off state in accordance with the operation status of ionizers 52 in the non-contact static elimination unit 58.

According to the present embodiment, the static elimination display unit 56 is an LED indicator, but other types may also be used. For example, the static elimination display unit 56 may be a liquid crystal or other display. The information displayed by the static elimination display unit 56 is not limited to the information regarding the non-contact static elimination unit 58. The static elimination display unit 56 may display information regarding the contact static elimination unit 57.

The static elimination apparatus 200 has a door 250 (refer to FIG. 3) that constitutes the front surface of the apparatus, and the door 250 is openable and closable relative to the housing 59 by an opening and closing mechanism (not illustrated). The opening or closing of the door 250 of the static elimination apparatus 200 is detected by a door sensor 202. The user can access an upper unit 401 and a lower unit 402 by opening the door 250. More specifically, as illustrated in FIG. 2, the upper unit 401 has a static elimination counter roller 51 and an ionizer 52*a* disposed therein. The lower unit 402 has a static elimination roller 50, an ionizer 52*b*, and the conveyance guide 53 disposed therein. The upper unit 401 is configured to be openable and closable relative to the lower unit 402.

Figure 4:
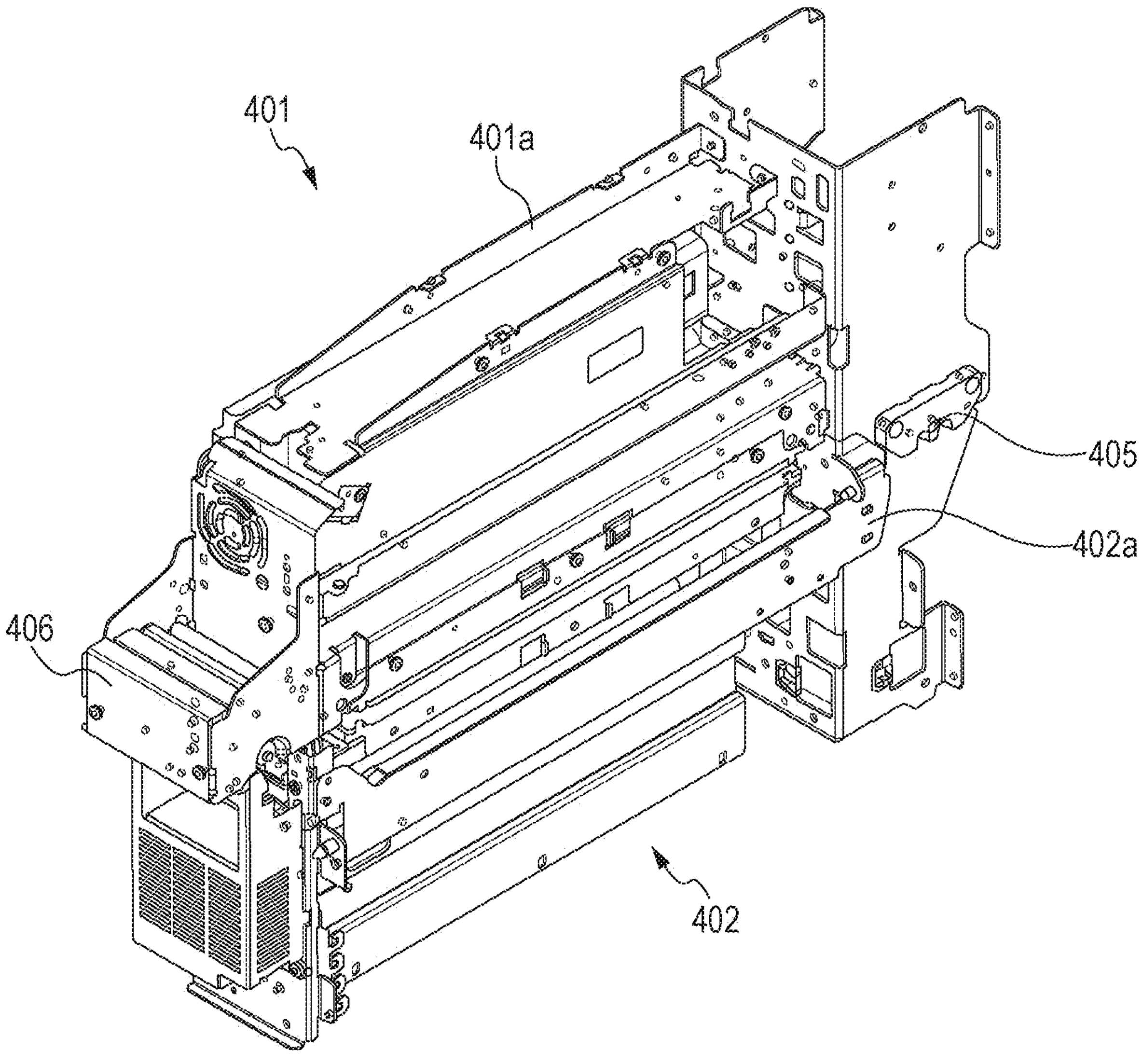
FIG. 4 is a perspective view of an upper unit and a lower unit with the upper unit closed.
Figure 5:
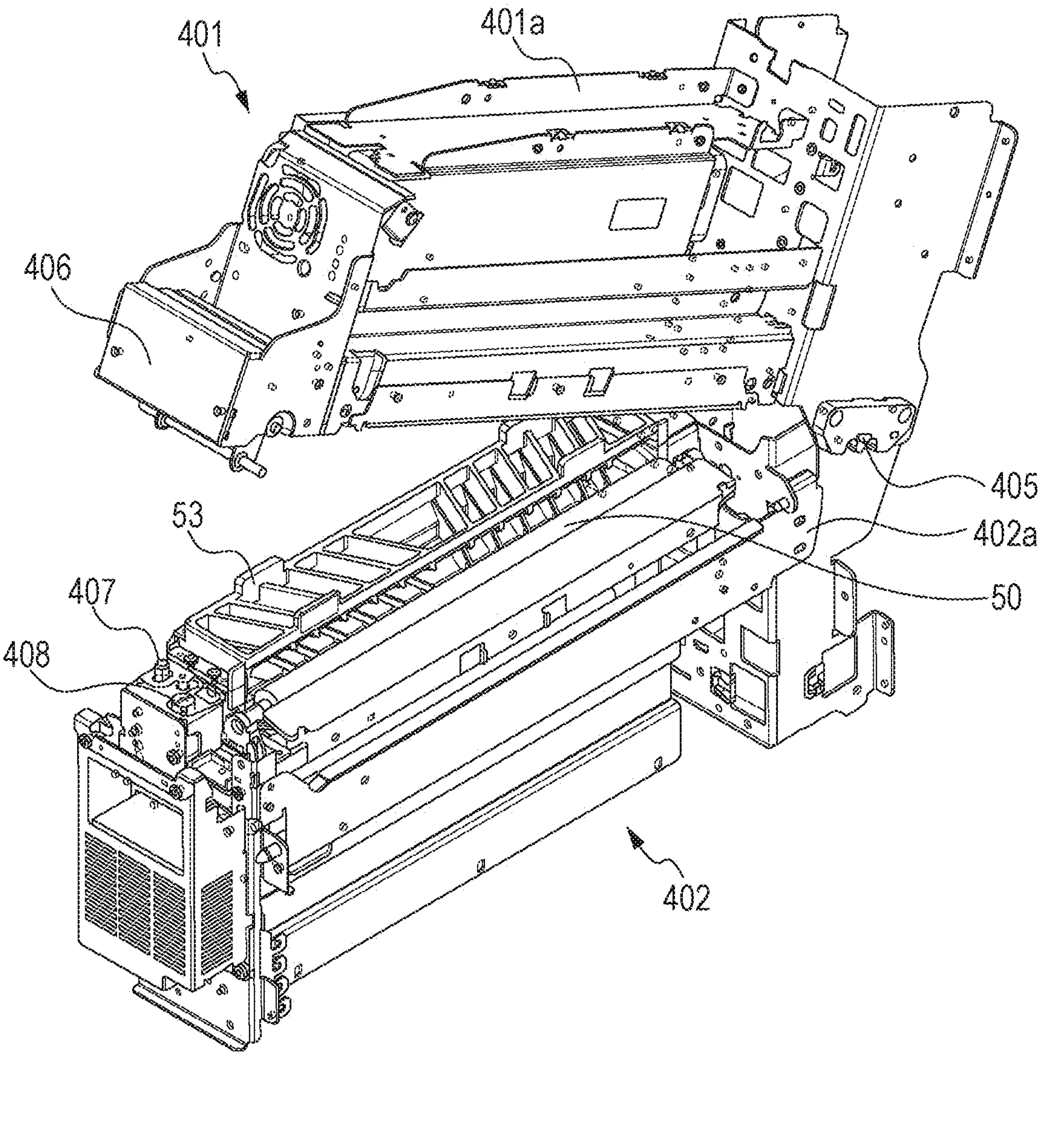
FIG. 5 is a perspective view of the upper unit and the lower unit with the upper unit open.

FIG. 4 is a perspective view of the upper unit 401 and the lower unit 402 with the upper unit 401 closed. FIG. 5 is a perspective view of the upper unit 401 and the lower unit 402 with the upper unit 401 open. The upper unit 401 includes an upper housing 401*a* made of sheet metal or the like, and the ionizer 52*a* is fixed to the upper housing 401*a*. The lower unit 402 includes a lower housing 402*a* made of sheet metal or the like, and the ionizer 52*b* is fixed to the lower housing 402*a*. The lower unit 402 is fixed to the housing 59 of the static elimination apparatus 200 so as not to move relative to the housing 59. The upper unit 401 is rotatable about a rotary shaft 405 relative to the lower unit 402. The upper unit 401 is provided with a handle 406. The upper unit 401 rotates inside of the housing 59, and thus the rotatable range of the upper unit 401 is regulated by the height of the top surface of the housing 59. That is, the upper unit 401 is rotatable from a closed position to a position where the upper unit 401 touches the top surface of the housing 59.

To maintain the static elimination performance of the ionizers 52, the user needs to perform maintenance on the electrode portions of the ionizers 52. The upper unit 401 configured to be rotatable relative to the lower unit 402 enables the user to access the electrode portion.

Figure 6:
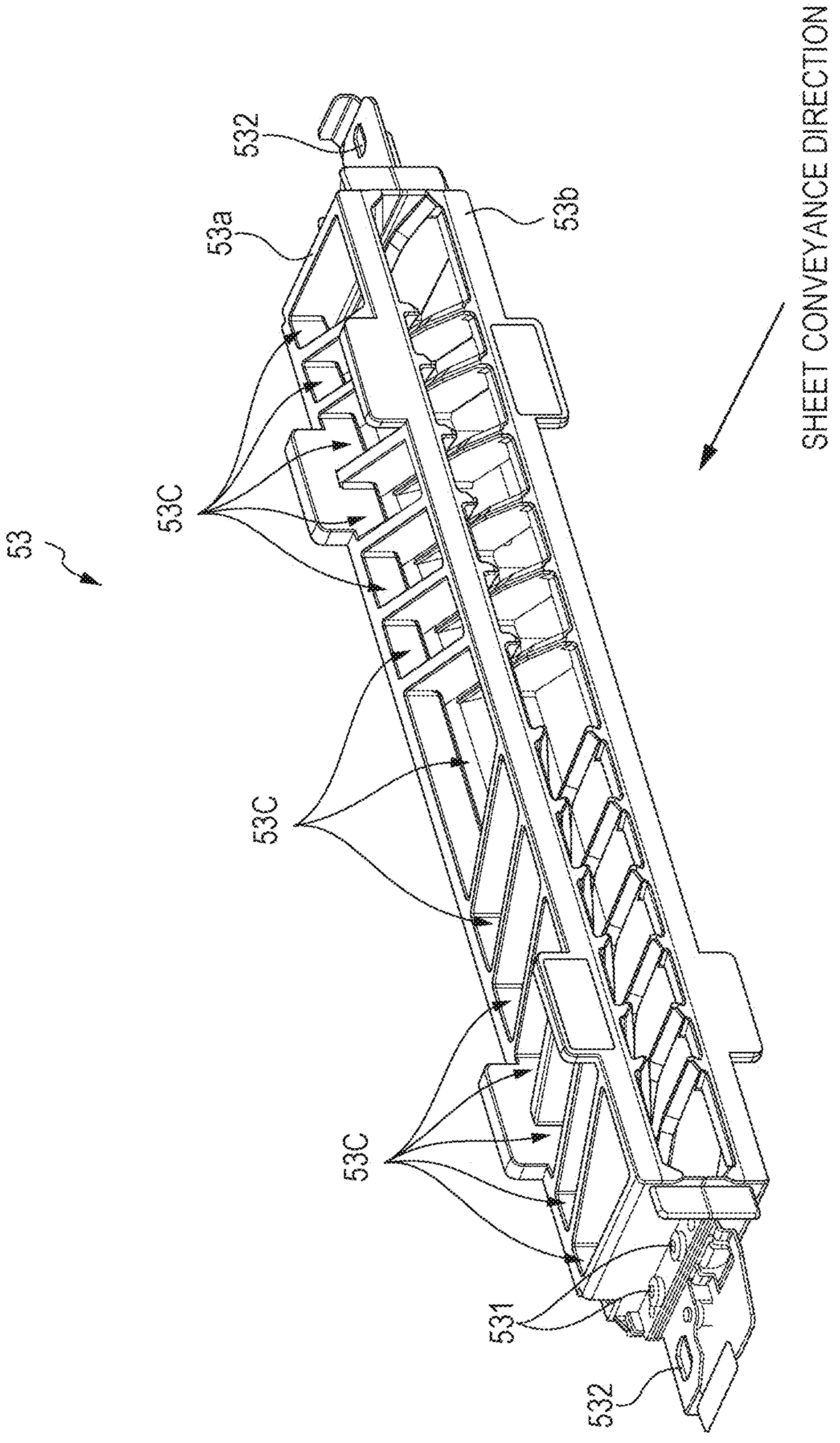
FIG. 6 is a perspective view of a conveyance guide of a non-contact static elimination unit.

FIG. 6 is a perspective view of the conveyance guide 53 that guides a sheet. The conveyance guide 53 has two fitting holes 532 provided on either side of the conveyance path in the width direction perpendicular to the sheet conveyance direction, where each of protruding portions 407 (described below) is to be fitted into one of the fitting holes 532. As illustrated in FIG. 5, the lower unit 402 has the two protruding portions 407 provided on either side of the conveyance path in the width direction perpendicular to the sheet conveyance direction and protruding upward. Each of the two fitting holes 532 of the conveyance guide 53 is fitted with a corresponding protruding portion 407 of the lower unit 402, so that the conveyance guide 53 is positioned on the lower unit 402. The positioned conveyance guide 53 is detachably attached to the lower housing 402*a* of the lower unit 402 by screws 408 serving as fixing members and located at the front side of the apparatus. However, instead of being fixed by a screw, the conveyance guide 53 may be configured to be rotatable relative to the lower unit 402 and be fixed to the lower unit 402 by an engaging member.

In the configuration described above, when cleaning a charge-eliminating needle 520 of the ionizer 52*a*, the user opens the door 250 and holds the handle 406 to rotate the upper unit 401 upward. This allows the user to access the charge-eliminating needle 520 of the ionizer 52*a*. When cleaning the charge-eliminating needle 520 of the ionizer 52*b*, the user rotates the upper unit 401 upward, and then detaches the conveyance guide 53 from the lower unit 402. This allows the user to access the charge-eliminating needle

520 of the ionizer 52*b* and perform maintenance (cleaning) on the ionizers 52 of the non-contact static elimination unit 58.

When the user rotates the upper unit 401 upward, the static elimination roller 50 and the static elimination counter roller 51 are separated from each other. Therefore, if a sheet is jammed in the static elimination apparatus, the user can remove the jammed sheet by rotating the upper unit 401.

Contact Static Elimination Unit

As illustrated in FIG. 2, the contact static elimination unit 57 includes the static elimination roller 50 that performs static elimination in a contact manner, the static elimination counter roller 51, and a high voltage board 55 that generates a high voltage to be applied to the static elimination roller 50. The static elimination roller 50 includes an elastic layer of ion-conductive foam rubber and a core metal. The static elimination roller 50 has an outer diameter of 20 mm to 25 mm, and the resistance value of the static elimination roller 50 is $1\times10^5\Omega$ to $1\times10^8\Omega$ when measured at 23° C. and 50% RH with 2 kV voltage applied. The static elimination roller 50 is a member similar to the outer roller 9 for secondary transfer. A static elimination voltage, which is a DC voltage regulated at a constant level, is applied to the static elimination roller 50 by the high voltage board 55. According to the present embodiment, as described above, the sheet S having a negatively charged upper surface and a positively charged lower surface is conveyed to the static elimination apparatus 200. Therefore, the high voltage board 55 applies a negative voltage to the static elimination roller 50 disposed adjacent to the lower surface of the sheet S.

The static elimination counter roller 51 is made of stainless steel (SUS) and is electrically grounded (connected to ground). The static elimination counter roller 51 is a roller with an outer diameter of 20 mm to 25 mm and is disposed facing the static elimination roller 50.

The static elimination roller 50 and the static elimination counter roller 51 form a static elimination nip portion. A static elimination roller pair consisting of the static elimination roller 50 and the static elimination counter roller 51 is in contact with the sheet S and partially removes the residual charge of the sheet. The contact static elimination unit 57 according to the present embodiment is in direct contact with the sheet S and applies a voltage to the sheet S, improving the static elimination effect. However, significant ununiformity in the surface potential of the sheet S remains after static elimination, which may result in uneven charge removal. Accordingly, the static elimination apparatus 200 of the present embodiment is provided with the non-contact static elimination unit 58 downstream of the contact static elimination unit 57 in the sheet conveyance direction.

According to the present embodiment, the static elimination counter roller 51 rotates by receiving a drive force from a static elimination drive motor (not illustrated) and conveys the sheet S nipped in the static elimination nip portion. According to the present embodiment, the static elimination roller 50 receives a negative voltage from the high voltage board 55, and the static elimination counter roller 51 is electrically grounded. However, the disclosure is not limited to the above-described embodiment. The static elimination counter roller 51 may receive a positive voltage from the high voltage board 55, and the static elimination roller 50 may be electrically grounded.

Non-Contact Static Elimination Unit

The non-contact static elimination unit 58 includes the ionizers 52 (52*a*, 52*b*), which performs static elimination in a non-contact manner. The ionizer 52*a* according to the present embodiment is a bar type ionizer that extends in the width direction perpendicular to the sheet conveyance direction. The ionizer 52*a* includes a charge-eliminating needle 520 that generates ions, and an ionizer control unit 521 that controls the ionizer. The ionizer 52*b* has the same configuration as the ionizer 52*a*. The two ionizers 52 are respectively disposed above and below the conveyance guide 53. The ionizer 52*a* is disposed above the conveyance guide 53, while the ionizer 52*b* is disposed below the conveyance guide 53. An AC bias is applied to the ionizers 52, and positive and negative ions are alternately emitted by corona charge-eliminating. Therefore, it is possible to simultaneously eliminate the residual charges on the front and back surfaces of the sheet S, regardless of the direction of polarity of the residual charges on the sheet S in the contact static elimination unit 57. According to the present embodiment, although the static elimination effect for the sheet S by the non-contact static elimination unit 58 is smaller than that by the contact static elimination unit 57, ununiformity in surface potential of the sheet S is reduced through the static elimination process. Therefore, the non-contact static elimination unit 58 can adjust the surface potential of the sheet S that has become non-uniform due to the contact static elimination unit 57. The charge-eliminating needle 520 according to the present embodiment is an example of an electrode portion.

The conveyance guide 53 is a member for guiding a sheet. The conveyance guide 53 includes an upper conveyance guide 53*a* disposed facing the upper surface of the sheet and a lower conveyance guide 53*b* disposed facing the lower surface of the sheet. The conveyance guide 53 is disposed below the ionizer 52*a* disposed in the upper unit 401 and above the ionizer 52*b* disposed in the lower unit 402 in the vertical direction. That is, the conveyance guide 53 is disposed between the ionizer 52*a* and the ionizer 52*b* in the vertical direction. The sheet S that has passed through the static elimination roller pair consisting of the static elimination roller 50 and the static elimination counter roller 51 is conveyed between the upper conveyance guide 53*a* and the lower conveyance guide 53*b*. The upper conveyance guide 53*a* and the lower conveyance guide 53*b* are made of an insulating resin composed of PC (polycarbonate) and ABS (acrylonitrile-butadiene-styrene). The volume resistivity of the conveyance guides according to the present embodiment is $1\times10^{14}$ Ω·cm.

FIG. 6 is a perspective view of the conveyance guide 53. To ensure that ions generated by the charge-eliminating needle 520, which is an ion emitter, are not physically shielded by the conveyance guide 53, the conveyance guide 53*a* has an opening 53*c*. More specifically, the upper conveyance guide 53*a* has a plurality of openings 53*c* aligned in the width direction that is perpendicular to the sheet conveyance direction. Similarly, the lower conveyance guide 53*b* has a plurality of openings. The upper conveyance guide 53*a* and the lower conveyance guide 53*b* are fixed to each other by a plurality of screws 531 provided at both end portions in the width direction to form a single guide unit (that is, the conveyance guide 53).

In the present embodiment, the ionizer 52 is employed as the non-contact static elimination unit, but the disclosure is not limited to the above-described embodiment. For example, an AC corotron system that applies high voltage to a wire may be employed as the non-contact static elimination unit. In the present embodiment, one of the ionizers 52 is disposed adjacent to the upper surface, and the other is disposed adjacent to the lower surface of the sheet, but the disclosure is not limited to the above-described embodiment. For example, the ionizer 52 may be disposed adjacent to only one surface of the sheet, either the upper surface or the lower surface. The applied high voltage may be a DC voltage instead of an AC voltage.

Configuration of Static Elimination Operation Unit

According to the present embodiment, the two static elimination units, that is, a contact static elimination unit 57 and a non-contact static elimination unit 58 are provided, and the static electricity on a sheet is eliminated using the two static elimination units. However, the static elimination apparatus 200 can also eliminate static electricity on a sheet by operating only the non-contact static elimination unit 58 without operating the contact static elimination unit 57. For example, for a plain paper sheet or the like with low electrical resistance, it is possible to sufficiently eliminate the static electricity on the sheet by using only the non-contact static elimination unit 58 without using the contact static elimination unit 57.

For a sheet with high electrical resistance, such as a synthetic paper sheet, it is desirable to eliminate static electricity on the sheet by using both the contact static elimination unit 57 and the non-contact static elimination unit 58. Accordingly, the user can freely change the settings of the static elimination apparatus 200 using the static elimination operation unit 54 in accordance with the type of sheet to be printed in a job.

The static elimination operation unit 54 is disposed on the top surface 200*a* of the housing of the static elimination apparatus 200 (the upper surface of the apparatus). The static elimination operation unit 54 may be disposed on the front surface 200*b* of the housing of the static elimination apparatus 200 (the front surface of the apparatus). According to the present embodiment, the static elimination operation unit 54 includes a mode lever 54*a* and a dial 54*b*. The mode lever 54*a* is a selector switch for manually switching voltage application of the high voltage board 55 to the static elimination roller 50 between "ON" and "OFF" (active and inactive) states. Even when the mode lever 54*a* is in the OFF state, a sheet is conveyed. In addition, even when the mode lever 54*a* is in the OFF state, the non-contact static elimination unit 58 eliminates the static electricity.

The dial 54*b* is a thumb-rotary switch for manually setting the voltage value applied to the static elimination roller 50 by the high voltage board 55. According to the present embodiment, the static elimination operation unit has two manual setting portions: the mode lever 54*a* and the dial 54*b*, so that the user can change the setting of the mode lever 54*a* without changing the setting of the dial 54*b*.

However, the setting of the voltage value applied to the static elimination roller 50 is not limited to manual setting by the user. The image forming apparatus 100 may transmit the type of sheet to the static elimination apparatus 200, and a static elimination CPU 82 (refer to FIG. 7) of the static elimination apparatus 200 may determine the voltage value to be applied to the static elimination roller 50 based on the type of sheet. Alternatively, a detection roller or a surface potential sensor that detects the charge amount of the sheet may be disposed in the static elimination apparatus 200 to measure the charge amount of the sheet after image formation, and the static elimination CPU 82 may determine the voltage value applied to the static elimination roller 50 based on the measured charge amount of the sheet. Still alternatively, to set the voltage value to be applied to the static elimination roller 50, the user may select one of manual setting by the user and automatic setting based on measurement of the charge amount of the sheet by, for example, the detection roller.

Image Forming System Block Diagram

Figure 7:
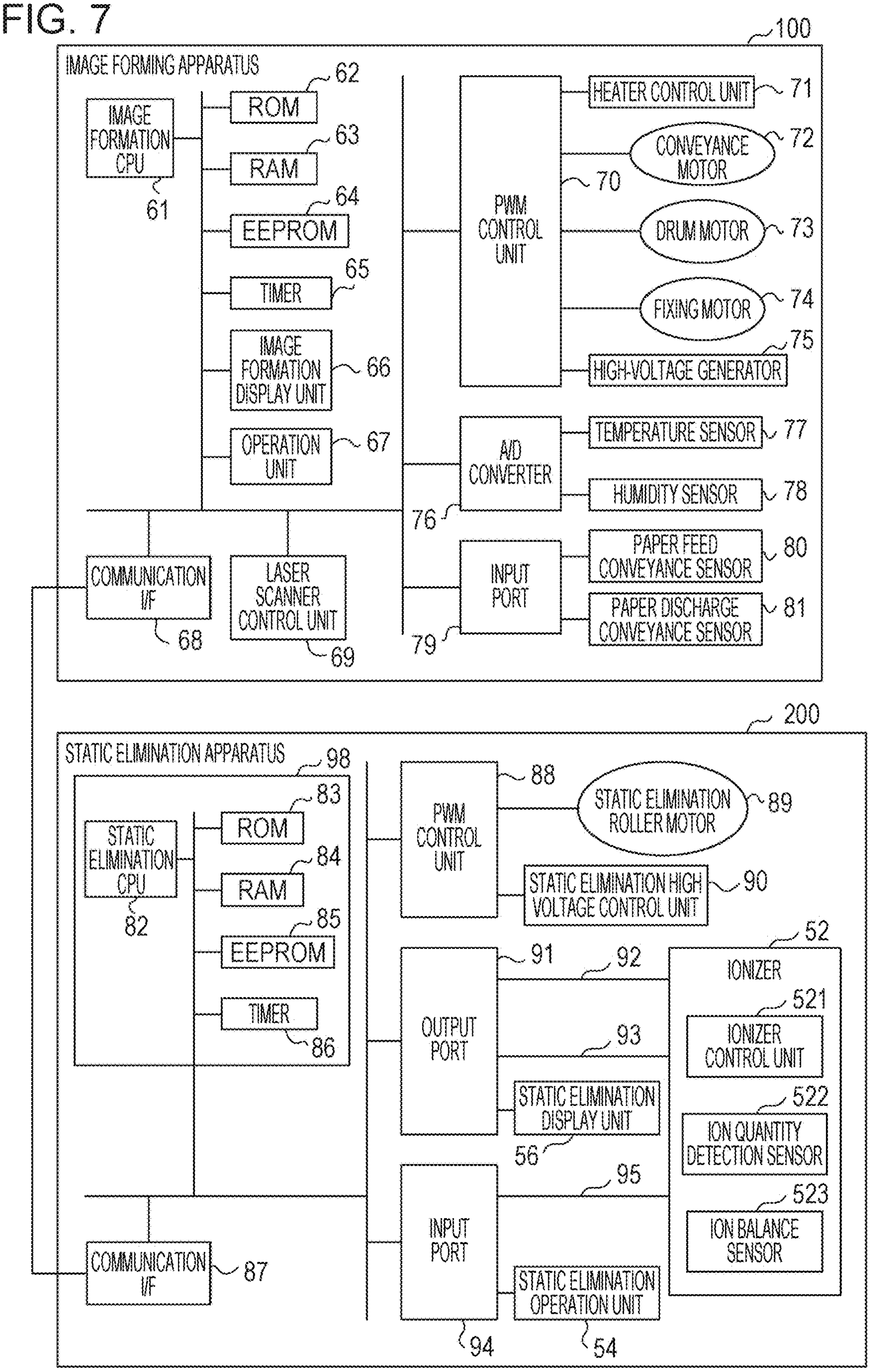
FIG. 7 is a control block diagram of an image forming apparatus and the static elimination apparatus.

FIG. 7 is a block diagram of the electrical configuration of the image forming apparatus 100 and the static elimination apparatus 200. The configuration of the image forming apparatus 100 will now be described. The image forming apparatus 100 includes the image formation CPU 61, a ROM 62, a RAM 63, an EEPROM 64, a timer 65, the image formation display unit 66, an operation unit 67, a communication interface (I/F) 68, a laser scanner control unit 69, a PWM control unit 70, an A/D converter 76, and an input port 79. These constituent elements are connected to one another via a system bus. In addition, a heater control unit 71, a conveyance motor 72, a drum motor 73, a fixing motor 74, and a high-voltage generator 75 are connected to the PWM control unit 70. A temperature sensor 77 and a humidity sensor 78 are connected to the A/D converter 76. A paper feed conveyance sensor 80 and a paper discharge conveyance sensor 81 are connected to the input port 79.

The image formation CPU 61 performs overall control of image processing and printing based on the stored programs and the like.

The ROM 62 and the EEPROM 64 store programs and data necessary for the image formation CPU 61 to perform various processes, while the RAM 63 operates as a work area. The timer 65 is used by the image formation CPU 61 to perform various timing control functions. The image formation display unit 66 presents the setting information of the image forming apparatus 100 and the processing status of a print job. The operation unit 67 receives various setting inputs and operation instructions from the user. The communication I/F 68 is connected to the static elimination apparatus 200 via a communication cable, and communication is performed to control the two apparatuses.

The laser scanner control unit 69 is a device that emits a laser beam modulated based on image data onto the photoconductive drum 1, which is charged to form an electrostatic latent image. In the laser scanner control unit 69, a laser beam is deflected with a polygon mirror and emitted to the photoconductive drum 1, which is charged to a uniform negative potential by the high-voltage generator 75 (described below). This neutralizes the negative charge in the area of the photoconductive drum 1 onto which the laser beam is emitted and forms an electrostatic latent image.

The PWM control unit 70 controls the heater control unit 71, the conveyance motor 72, the drum motor 73, the fixing motor 74, and the high-voltage generator 75. The heater control unit 71 controls the temperature of the fixing device 30. The conveyance motor 72 drives conveyance rollers for conveying a sheet and the pre-fixing conveyance unit 31. The drum motor 73 drives the rotation of the photoconductive drum 1. The fixing motor 74 drives a fixing belt and the like of the fixing device 30. The A/D converter 76 performs A/D conversion to convert analog signals output from the temperature sensor 77 and the humidity sensor 78 into digital signals. The input port 79 receives output signals from the paper feed conveyance sensor 80 and the sheet-discharge conveyance sensor 81.

The configuration of the static elimination apparatus 200 is described below. The static elimination apparatus 200 includes the static elimination CPU 82, a ROM 83, a RAM 84, an EEPROM 85, a timer 86, a communication I/F 87, a PWM control unit 88, an output port 91, and an input port 94. According to the present embodiment, the static elimination control unit 98 includes the static elimination CPU 82, the ROM 83, the RAM 84, the EEPROM 85, and the timer 86. These constituent elements are connected to one another via a system bus. The PWM control unit 88 is configured to be connected to a static elimination roller motor 89 and a static elimination high voltage control unit 90. The output port 91 outputs an ionizer ON/OFF signal 92 and a maintenance detection mode switching signal 93. The static elimination display unit 56 is configured to be connected to the output port 91, which outputs data corresponding to information to be displayed to the static elimination display unit 56. The input port 94 receives a maintenance detection signal 95 and is configured to be connected to the static elimination operation unit 54. The ionizer 52 receives the ionizer ON/OFF signal 92 and the maintenance detection mode switching signal 93 and outputs the maintenance detection signal 95.

The static elimination CPU 82 performs various controls necessary for eliminating static electricity and outputting a sheet based on stored programs and the like. The ROM 83 and the EEPROM 85 store programs and data necessary for the static elimination CPU 82 to perform various processes. The RAM 84 operates as a work area. The timer 86 performs various timing control for the static elimination CPU 82 and measures the operating time of the ionizer 52. The communication I/F 87 is connected to the image forming apparatus 100 via a communication cable, and communication is performed to control the two apparatuses.

The PWM control unit 88 controls the static elimination roller motor 89 and the static elimination high voltage control unit 90 to eliminate static electricity and convey a sheet ejected from the image forming apparatus 100. The output port 91 outputs the ionizer ON/OFF signal 92, the maintenance detection mode switching signal 93, and an ON/OFF signal of the static elimination display unit 56. The input port 94 receives the maintenance detection signal 95 and an ON/OFF signal of the static elimination operation unit 54.

The ionizer 52 switches between an ion generation mode and a stop mode in response to the ionizer ON/OFF signal 92. Ion generation is activated when the ionizer ON/OFF signal 92 is at an H level, and deactivated at an L level. The static elimination CPU 82 switches the ionizer ON/OFF signal 92 at predetermined timing to control activation/deactivation of ion generation. When the ionizer ON/OFF signal 92 is at an H level, a voltage is applied to the ionizer, and ions are generated.

The maintenance detection mode switching signal 93 is a signal that switches the ionizer to a maintenance detection mode to determine whether maintenance of the electrode portion is needed. The static elimination CPU 82 switches the maintenance detection mode switching signal 93 from the L level to the H level at a predetermined timing, thus setting the ionizer 52 in the maintenance detection mode. The maintenance detection mode switching signal 93 returns to the L level 100 ms after transitioning from the L level to the H level.

The maintenance detection signal 95 is a signal that is output when, in the maintenance detection mode of the ionizer, it is determined that maintenance of the electrode portion is needed. More specifically, when the maintenance detection mode switching signal 93 is switched from the L level to the H level, the ionizer control unit 521 enters the maintenance detection mode to determine whether maintenance is needed. During the maintenance detection mode, the ionizer control unit 521 determines whether maintenance is needed. The maintenance detection signal 95 reflects the determination made by the ionizer control unit 521 as to whether maintenance is needed. More specifically, if the maintenance detection signal 95 remains at the L level for a predetermined period of time, maintenance is not needed; otherwise, if the signal is at the H level, the maintenance is needed. In the maintenance detection mode, the ionizer control unit 521 continues to detect whether maintenance is needed until the maintenance detection signal 95 at the H level is output or the predetermined period of time elapses.

When the maintenance detection signal 95 at the H level is output from the ionizer control unit 521 to the static elimination CPU 82, the static elimination CPU 82 displays a maintenance warning on the image formation display unit 66 via the communication I/F 87, prompting the user to perform maintenance on the ionizer 52. In the following description, the H level of the maintenance detection signal 95 corresponds to a state in which the maintenance detection signal 95 is output.

The ionizer 52 includes the ionizer control unit 521, an ion quantity detection sensor 522 that detects the quantity of ions, and an ion balance sensor 523 that detects the balance between positive and negative ions. During the maintenance detection mode, the ionizer control unit 521 uses the ion quantity detection sensor 522 and the ion balance sensor 523 to determine whether it is capable of outputting ions in a normal quantity and with balanced polarity.

Ionizer Maintenance Detection Control

Upon detection of the maintenance detection mode switching signal, the ionizer 52 detects whether maintenance is needed. More specifically, upon detection of the maintenance detection mode switching signal 93, the ionizer 52 starts operating, and the ion quantity detection sensor 522 detects the quantity of generated ions per unit time. A predetermined voltage value is applied to the charge-eliminating needle 520, and if the detected quantity of generated ions is less than a predetermined quantity, the ionizer control unit 521 outputs a maintenance detection signal 95.

If the detected quantity of generated ions is greater than or equal to the predetermined quantity, the positive or negative voltage applied to the charge-eliminating needle 520 is gradually increased so that the ion balance detected by the ion balance sensor 523 is within a predetermined range. According to the present embodiment, a positive voltage (a high voltage pulse of positive polarity) and a negative voltage (a high voltage pulse of negative polarity) are alternately and repeatedly applied to the charge-eliminating needle 520. That is, feedback control is performed to adjust the ion balance between positive and negative ions by increasing the amplitude of the positive voltage or negative voltage. That is, the positive or negative voltage is controlled so that the ion balance detected by the ion balance sensor 523 approaches zero. Herein, the ion balance within a predetermined range means that the difference between the quantities of positive and negative ions generated by the ionizer 52 in one of the upper unit 401 and the lower unit 402 is within a predetermined range.

If the ion balance does not fall within the predetermined range even after the ionizer 52 increases the voltage applied to the charge-eliminating needle 520 to the specified upper limit, the ionizer control unit 521 outputs the maintenance detection signal 95. Even if the ion balance falls within the predetermined range, the ionizer control unit 521 continues to perform the maintenance detection control for 30 seconds after the detection of the maintenance detection mode switching signal 93. The maintenance detection control ends 30 seconds after the detection of the maintenance detection mode switching signal 93.

That is, the ionizer control unit 521 outputs the maintenance detection signal 95 when the quantity of ions generated by the ionizer 52 is less than the predetermined ion quantity or when the ion balance is not within the predetermined range. According to the present embodiment, the ion quantity detection sensor 522 and the ion balance sensor 523 are provided. However, the disclosure is not limited to the above-described embodiment. The quantity of generated ions and the ion balance may be calculated based on the positive and negative ion currents (return currents) that flow back to a circuit of the ionizer 52 through the ground.

According to the present embodiment, the ionizer detection process is performed to detect whether maintenance of the ionizers 52 is needed, but the disclosure is not limited to the above-described embodiment. The ionizer detection process may detect contamination of the ionizers 52 or measure the performance of the ionizer.

Screen Displayed by User Operation Unit

Figure 8A:
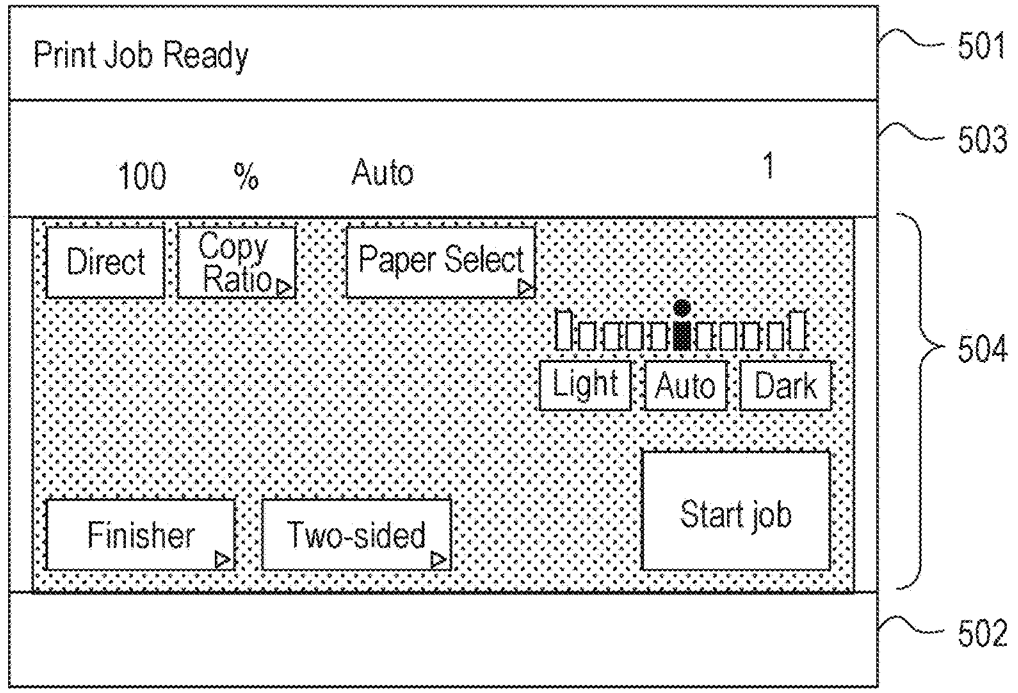
FIG. 8A illustrates a screen displayed on a user operation unit.
Figure 8B:
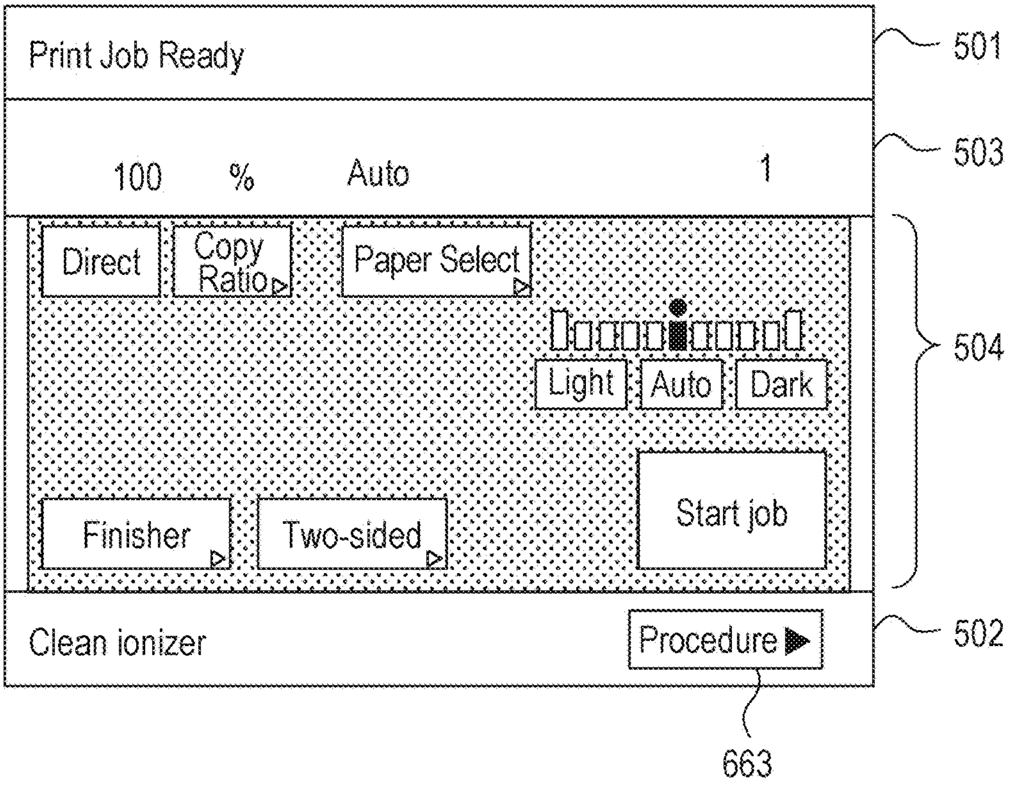
FIG. 8B illustrates a screen displayed on the user operation unit.

FIGS. 8A and 8B illustrate information displayed on the image formation display unit 66 of the image forming apparatus 100. The image formation display unit 66 displays the setting information of the image forming apparatus 100 and the processing status of a print job. According to the present embodiment, the image formation display unit 66 is a touch panel, and in addition to displaying the setting information and print job processing status, the image formation display unit 66 receives various setting information and operation instructions from the user.

The display screen has an upper status area 501 that is located on the top of the display screen and presents the status of the image forming apparatus 100, and a lower status area 502 that is located on the bottom of the display screen and presents a warning message about the image forming apparatus 100 and the static elimination apparatus 200. In addition, the display screen has a job setting area 504 located between the upper status area 501 and the lower status area 502 and used by the user to set the job information. A setting display area 503 is provided on top of the job setting area 504 to present the settings set by the user and used when a job is submitted to the image forming apparatus 100. The upper status area 501 mainly indicates the status of a print job: ready, in progress, or not available.

FIG. 8A illustrates a display screen of the image formation display unit 66 when the maintenance detection signal 95 is not output. FIG. 8B illustrates the display screen of the image formation display unit 66 when the maintenance detection signal 95 is output. More specifically, the screen in FIG. 8A does not display a message prompting the user to clean the ionizers 52. The screen in FIG. 8B displays a message prompting the user to clean the ionizers 52. According to the present embodiment, the image formation CPU 61 can receive a job even when the maintenance warning about the ionizers 52 is displayed. Therefore, the lower status area 502 of the screen in FIG. 8B displays a message prompting the user to clean the ionizers 52, and the upper status area 501 displays a message indicating that a job can be received.

According to the present embodiment, the image formation display unit 66 displays a message prompting the user to clean the ionizer 52, but the displayed information is not limited to this message. The degree of contamination of the ionizer 52 may be displayed. Alternatively, the static elimination performance of the ionizer 52 may be displayed.

As indicated by the screen illustrated in FIG. 8B, when the maintenance detection signal 95 is output, a guidance key 663 is displayed in the lower status area 502. The guidance key 663 can be used to display a guidance message indicating the procedure for cleaning. When the guidance key 663 is pressed by the user, the guidance message indicating the procedure for cleaning is displayed on a display screen. More specifically, as the cleaning procedure, a procedure for accessing the electrode portion of the ionizers 52 and a procedure for cleaning the ionizers 52 using respective cleaning members can be described by using an illustration, a text message, a video, or the like. For example, as the procedure for accessing the electrode portion of the ionizer, an instruction to lift the upper unit 401 of the static elimination apparatus 200 upward may be displayed.

According to the present embodiment, the message prompting the user to clean the ionizer is displayed by the image formation display unit 66 of the image forming apparatus 100. However, the disclosure is not limited to the above-described embodiment. The static elimination display unit 56 of the static elimination apparatus 200 may be used to prompt the user to clean the ionizer. For example, the color, the lighting intensity, or the blinking cycle of the LED of the static elimination display unit 56 may be changed to prompt the user to clean the ionizer. For example, the static elimination display unit 56 may include a display capable of presenting text message, and a text prompt message may be displayed on the display. In addition, both the image formation display unit 66 and the static elimination display unit 56 may be used.

Description of Flowchart

During maintenance of the electrode portion of the ionizer, a job cannot be executed.

Therefore, if, as a result of detection of the need for maintenance performed in the middle of a series of jobs, maintenance of the electrode portion is needed, the printing process needs to be interrupted, which reduces user's operating efficiency.

According to the present embodiment, if the accumulated operating time of the non-contact static elimination unit is greater than a first threshold value, detection of the need for maintenance is performed. In addition, when the image forming apparatus in a first state enters a second state in which power consumption is lower than in the first state, detection of the need for maintenance is performed. This reduces the frequency of interruptions to the user's printing operation and improves the operation efficiency.

Figure 9:
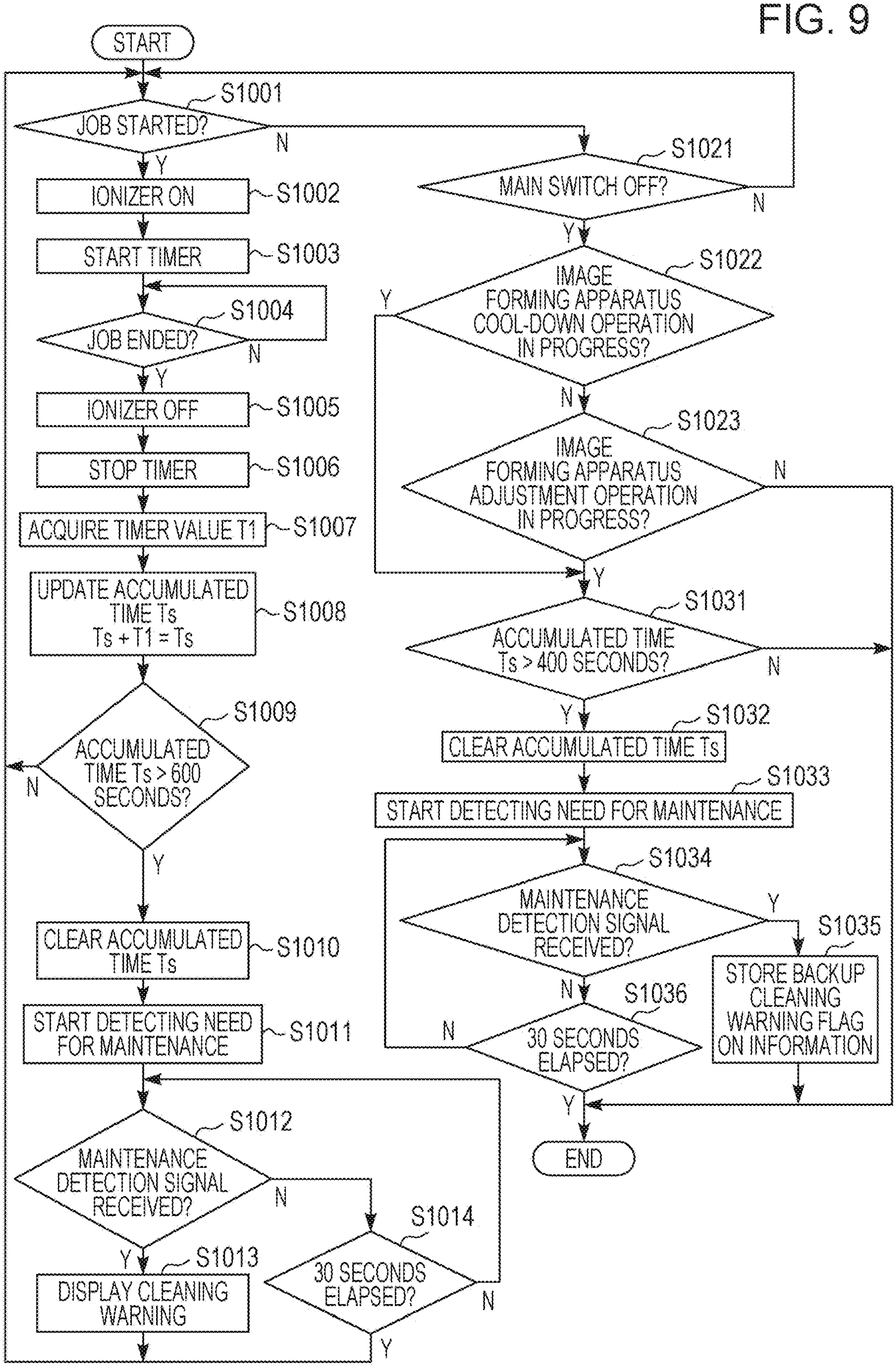
FIG. 9 illustrates a flowchart of the control performed by a static elimination control unit.

FIG. 9 illustrates a flowchart of the control performed by the static elimination CPU 82 of the static elimination control unit 98.

The static elimination CPU 82 acquires sheet information from the image formation CPU 61 via the communication I/F 87 and determines whether a job has been started (S1001). Before the job is started, the image formation display unit 66 of the image forming apparatus 100 displays information that a print job is ready, as illustrated in FIG. 8A. The sheet information of a job is data that includes information on whether a sheet is the last sheet of the job. The sheet information is transmitted from the image forming apparatus 100 to the static elimination apparatus 200 when a sheet is delivered from the image forming apparatus 100.

If a job is started (Y in S1001), the static elimination CPU 82 switches the ionizer ON/OFF signal 92 from the L level to the H level and starts the ionizer 52 to perform the output operation (S1002). The static elimination CPU 82 causes the timer 86 to start measuring the operating time of the ionizer 52 (S1003). Measurement by the timer 86 starts at 0 seconds.

When an image-formed sheet S passes through the ionizer 52, the static elimination CPU 82 determines whether the print job has ended (S1004). More specifically, the static elimination CPU 82 determines whether the last sheet of the print job has passed or not. If the last sheet has passed (Y in S1004), the static elimination CPU 82 switches the ionizer ON/OFF signal 92 from the H level to the L level to stop the output of the ionizer 52 (S1005). Subsequently, the static elimination CPU 82 terminates the measurement of the operating time of the ionizer 52 by the timer 86 (S1006).

The static elimination CPU 82 acquires a timer value T1 measured by the timer 86 (S1007). According to the present embodiment, the acquired timer value T1 is the operating time of the ionizer 52 for the job. An accumulated time Ts obtained by accumulating the timer value T1, which is the operating time of the ionizer 52 for each job, after the previous detection of the need for maintenance is stored in a memory. The timer value T1 for the current job is added to the accumulated time Ts (S1008). The accumulated time Ts is stored in a nonvolatile memory.

The static elimination CPU 82 determines whether the accumulated time Ts is greater than a first threshold value of 600 seconds (S1009). If the accumulated time Ts is less than or equal to 600 seconds (N in S1009), the processing performed by the static elimination CPU 82 returns to S1001. If the accumulated time Ts is greater than 600 seconds (Y in S1009), the static elimination CPU 82 initializes the accumulated time Ts to 0 (S1010). The static elimination CPU 82 switches the maintenance detection mode switching signal 93 from the L level to the H level and causes the ionizer 52 to start detection of the need for maintenance (S1011).

If the static elimination CPU 82 receives the maintenance detection signal 95 from the ionizer 52 (Y in S1012), the static elimination CPU 82 sends a maintenance warning notification to the image formation CPU 61 via the communication I/F 87 (S1013), and the processing returns to S1001. Upon receipt of the maintenance warning notification from the static elimination CPU 82, the image formation CPU 61 causes the image formation display unit 66 to display a maintenance warning for prompting the user to clean the ionizer (refer to FIG. 8B).

If the static elimination CPU 82 does not receive the maintenance detection signal 95 from the ionizer 52 (N in S1012) and 30 seconds have elapsed (S1014), the processing returns to S1001. That is, when the maintenance detection signal 95 remains at the L level for a predetermined period of time, this state indicates that maintenance detection is being performed for the predetermined period of time. In this case, cleaning of the ionizer 52 is not needed, so that the static elimination CPU 82 does not cause the image formation display unit 66 to display the maintenance warning for prompting the user to clean the ionizer (that is, the screen illustrated in FIG. 8A is displayed).

According to the present embodiment, the threshold value used to determine whether the ionizer needs to be cleaned is 30 seconds from the start of detection of the need for maintenance. However, the disclosure is not limited to the above-described embodiment, and any appropriate value may be set as the threshold value used to determine whether the ionizer needs to be cleaned.

When a user submits a job while the ionizer 52 is detecting the need for maintenance, the operation of detecting the need for maintenance may be interrupted, and the job may be given priority. However, when the detection of the need for maintenance is interrupted, the accumulated time Ts is not cleared.

According to the present embodiment, the accumulated time Ts, which is the operating time of the ionizer, is used to determine whether to perform detection of the need for maintenance; however, other values may be employed. For example, the accumulated number of sheets that have passed through the static elimination apparatus 200 may be employed to make the determination. In addition to the first threshold value, which is compared with the accumulated time Ts since the immediately previous detection of the need for maintenance, a third threshold value may be provided. This third value is compared with the timer value T1, which represents the operating time of the ionizer 52 during a single job. In this case, the static elimination CPU 82 performs a detection process of the need for maintenance when the accumulated time Ts across a plurality of static elimination processes is greater than the first threshold value. Furthermore, even when the accumulated time Ts is less than or equal to the first threshold value, the static elimination CPU 82 performs a detection process of the need for maintenance if the timer value T1, which is the operating time of the ionizer 52 in one static elimination process, is greater than the third threshold value. This enables the detection of the need for maintenance to be performed at an appropriate timing even if a long-time job is repeatedly performed.

If no job has been started (N in S1001), the static elimination CPU 82 determines whether a main switch is turned off (S1021). If the main switch is turned off (Y in S1021), the static elimination CPU 82 determines whether a cool-down operation (cooling operation) to decrease the temperature inside of the image forming apparatus 100 is in progress (S1022). If the cool-down operation is not in progress (N in S1022), the static elimination CPU 82 determines whether an automatic adjustment operation to adjust the image quality by the image forming apparatus 100 is in progress (S1023). If the automatic adjustment operation is not in progress (N in S1023), the processing ends.

If the image forming apparatus 100 is performing a cool-down operation (Y in S1022) or if the image forming apparatus 100 is performing an automatic adjustment operation (Y in S1023), the static elimination CPU 82 determines whether the accumulated time Ts is greater than a second threshold value of 400 seconds (S1031).

If the accumulated time Ts is less than or equal to a second threshold value of 400 seconds, the static elimination CPU 82 terminates the processing (N in S1031). That is, the static elimination CPU 82 does not perform detection of the need for maintenance if the accumulated time Ts is less than or equal to a second threshold value of 400 seconds.

If the accumulated time Ts is greater than a second threshold value of 400 seconds (Y in S1031), the static elimination CPU 82 initializes the accumulated time Ts to 0 (S1032). The static elimination CPU 82 switches the maintenance detection mode switching signal 93 from the L level to the H level and causes the ionizer 52 to start detecting whether maintenance is needed (S1033).

If the static elimination CPU 82 receives the maintenance detection signal 95 from the ionizer 52 (Y in S1034), the static elimination CPU 82 stores backup cleaning warning flag ON information in the EEPROM 85 as a backup value (S1035), and the processing ends. If the static elimination CPU 82 does not receive the maintenance detection signal 95 from the ionizer 52 (N in S1034) and 30 seconds have elapsed (Y in S1036), the processing ends. The image forming apparatus 100 is turned off after the cool-down operation or the automatic adjustment operation is completed.

However, the procedure for determining whether detection of the need for maintenance is performed is not limited to the above-described procedure. The determination of whether cool-down is in progress (S1022), whether the automatic adjustment operation is in progress (S1023), and whether the accumulated time is greater than the second threshold value (S1031) may be skipped as appropriate.

The static elimination control unit 98 and the ionizer control unit 521 are examples of control units. The static elimination process and the detection process of the need for maintenance may be performed by either the static elimination control unit 98 or the ionizer control unit 521.

According to the present embodiment, detection of the need for maintenance is performed when the main switch is turned off. The operation unit 67 includes the main switch and receives various settings and operation instructions from the user. The main switch is used to turn on and off the power of the image forming apparatus. The power-on state is an example of the first state, and the power-off state is an example of the second state in which power consumption is lower than in the first state. When the main switch is switched from ON to OFF, the image forming apparatus 100 transitions from the first state to the second state. When the main switch is switched from OFF to ON, the image forming apparatus 100 transitions from the second state to the first state.

According to the present embodiment, the first state is a state in which the power is turned on, and the second state is a state in which the power is turned off, but the states are not limited to described above. The first state may correspond to a normal state, and the second state, in which power consumption is lower than in the first state, may correspond to a sleep state. The image forming apparatus transitions from the normal state to the sleep state when priority is given to a power saving mode and when no operation is performed after a certain period of time has elapsed after the job ends. The power saving mode is selected by pressing a power-saving key provided on the operation unit 67. The time from the end of a job to the transition to the sleep state is set in advance, but may be changed using the operation unit 67.

In addition, as described above, the image forming apparatus automatically enters the sleep state when no operation is performed for a certain period of time, but this process is not limited to the above description. The image forming apparatus may transition to the sleep state when the power-saving key is pressed. That is, when the power saving mode is selected by the user and the job ends, the static elimination CPU 82 may cause the ionizer 52 to perform detection of the need for maintenance. Thereafter, when the image forming apparatus enters the normal state from the sleep state, the static elimination CPU 82 displays the detection result of the need for maintenance on the image formation display unit 66. However, the detection result of the need for maintenance may be presented during the sleep state.

That is, the static elimination CPU 82 performs a detection process of the need for maintenance during the period between reception of the instruction to cause the image forming apparatus to transition from the first state to the second state, in which power consumption is lower than in the first state, and the image forming apparatus's entry into the second state. In other words, the static elimination CPU 82 performs a detection process of the need for maintenance during the first state in response to the instruction to cause the image forming apparatus to transition from the first state to the second state, in which power consumption is lower than in the first state. The image forming apparatus enters the second state after the detection of the need for maintenance is completed.

One example of the instruction to cause the image forming apparatus to transition from the first state to the second state is turning the power on/off switch of the image forming apparatus from ON to OFF. Another example is pressing the power-saving key to cause the image forming apparatus to enter the sleep state. Still another example is an event in which no operation is detected for a preset time period under automatic sleep mode conditions.

According to the present embodiment, when the main switch is turned off and the accumulated time Ts is greater than a second threshold value of 400 seconds, the static elimination CPU 82 performs detection of the need for maintenance of the ionizers 52. However, the disclosure is not limited to the above-described embodiment. The static elimination CPU 82 may perform detection of the need for maintenance every time the main switch is turned off without providing a threshold value. However, if detection of the need for maintenance is performed during the period between the end of the last job before receipt of a power-off instruction and actual receipt of a power-off instruction, such detection need not be repeated upon power-off.

To prevent deterioration of the ionizers 52, it is desirable to perform detection of the need for maintenance less frequently. Therefore, as in the present embodiment, to determine whether the static elimination CPU 82 performs a detection process of the need for maintenance upon power-off, it is more desirable to set a threshold value to be compared with the accumulated time. More specifically, the second threshold value, which is the reference used in detection of the need for maintenance performed upon power-off, is less than the first threshold value, which is the reference used in detection of the need for maintenance performed after the static elimination process. According to the present embodiment, the first threshold value is 600 seconds, and the second threshold value is 400 seconds. That is, the second threshold value is set to a value less than or equal to two-thirds of the first threshold value.

Figure 10:
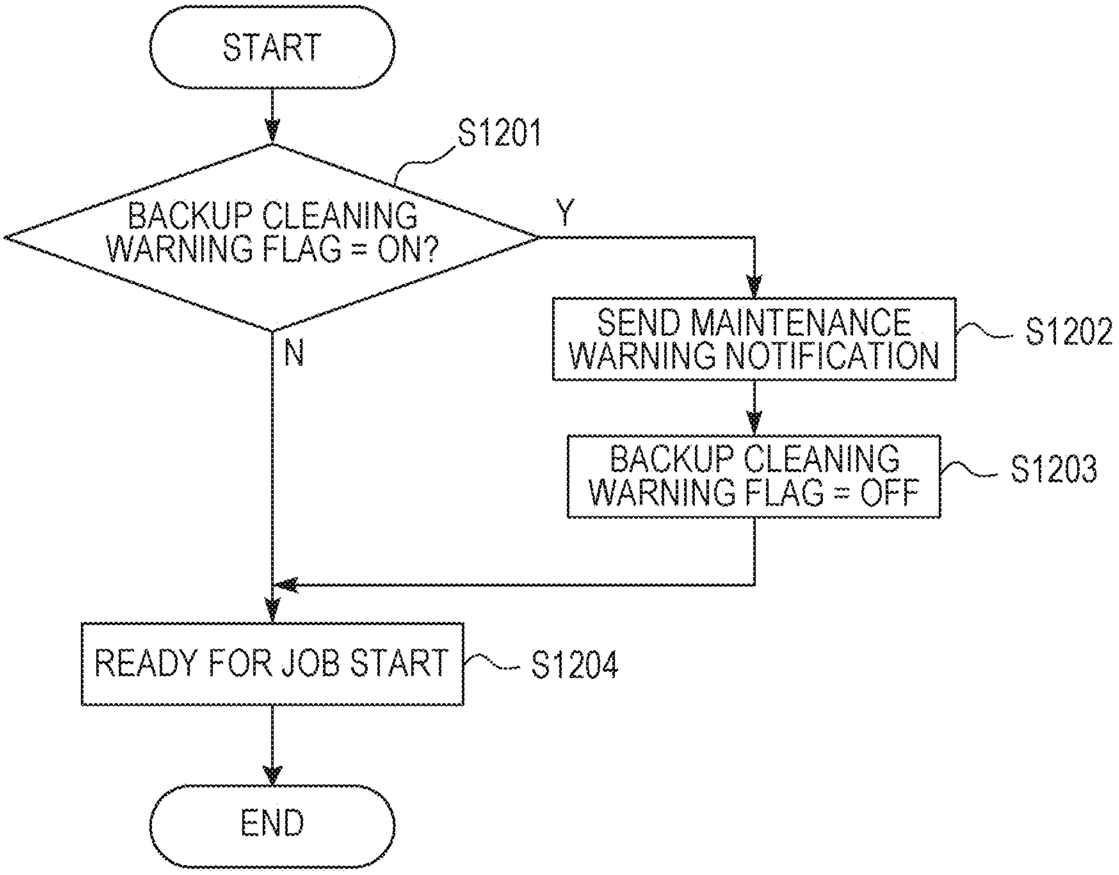
FIG. 10 illustrates a flowchart of the control performed by the static elimination control unit.

FIG. 10 illustrates a flowchart of the process performed by the static elimination CPU 82 upon power-on.

When the power of the image forming apparatus 100 is turned on, the static elimination CPU 82 reads the backup value from the EEPROM 85 and determines whether the value of the backup cleaning warning flag is ON (S1201). This determination is made based on, for example, the detection result of the need for maintenance stored in the EEPROM 85 in S1035 illustrated in FIG. 9. If the value of the backup cleaning warning flag is ON (Y in S1201), the static elimination CPU 82 sends the maintenance warning notification to the image formation CPU 61 via the communication I/F 87 (S1202). Upon receipt of the maintenance warning notification from the static elimination CPU 82, the image formation CPU 61 displays, on the image formation display unit 66, a warning prompting cleaning of the ionizer (refer to FIG. 8B). Subsequently, the static elimination CPU 82 sets the backup cleaning warning flag to OFF (S1203) and waits until a job is started (S1204).

If the value of the backup cleaning warning flag is OFF (N in S1201), the static elimination CPU 82 waits until a job is started (S1204). At this time, since cleaning of the ionizer 52 is not needed, the static elimination CPU 82 causes the image formation display unit 66 not to display a maintenance warning prompting cleaning of the ionizer 52 (the screen illustrated FIG. 8A is displayed).

According to the present embodiment, the detection result of the need for maintenance performed at power-off is displayed on the image formation display unit 66 upon power-on. However, the disclosure is not limited to the above-described embodiment. Upon receipt of the maintenance detection signal 95 from the ionizer 52 (Y in S1034), the static elimination CPU 82 may cause the image formation display unit 66 to display the detection result of the need for maintenance until power-off. However, at the time of power-off, the user may not be near the image formation display unit 66. Therefore, to ensure that the user can easily recognize the detection result of the need for maintenance, it is desirable to display the detection result upon power-on.

Instead of performing detection of the need for maintenance upon power-off of the image forming apparatus, the static elimination CPU 82 may perform the detection upon power-on. However, if the static elimination CPU 82 performs detection of the need for maintenance upon power-off of the image forming apparatus, the user can confirm the detection result and prepare for cleaning upon power-on without waiting for completion of the detection of the need for maintenance.

That is, in addition to performing detection of the need for maintenance after the end of a job if the accumulated time Ts of the ionizer is greater than the first threshold value, the control unit performs a detection process of the need for maintenance when the image forming apparatus 100 transitions from the first state to the second state in which the power consumption is lower than in the first state. This can reduce the frequency of printing operation interruptions resulting from the user-performed ionizer cleaning and the inability to start the subsequent job execution. In addition, the detection result of the need for maintenance performed when the image forming apparatus 100 transitions from the first state to the second state is displayed on the image formation display unit 66 when the image forming apparatus 100 transitions from the second state to the first state. This allows the user to start the printing operation after completion of cleaning the ionizer.

While the present embodiment has been described with reference to the non-contact static elimination unit 58 including the ionizers 52, a corotron may be used instead of the non-contact static elimination unit 58. While the present embodiment has been described with reference to the contact static elimination unit 57 in which a voltage is applied to the static elimination roller 50 and the voltage value is controlled so that the surface potential of a sheet approaches zero, the disclosure is not limited to the above-described embodiment. The static elimination apparatus 200 also functions as a charge adjustment apparatus that adjusts the charged state of a sheet by supplying a charge to the sheet via the static elimination roller 50 serving as a charge supply member. The charge adjustment apparatus may not always reduce or eliminate the amount of residual charge on the sheet. For example, the charge adjustment apparatus may adjust the amount of residual charge on each side of a sheet so that the facing sides of overlapping sheets are charged with the same polarity when the sheets are stacked after being processed by the charge adjustment apparatus. More specifically, the charge adjustment apparatus applies a voltage to every other sheet among a plurality of sheets so as to reverse the electrostatic polarity on the sheet surface. That is, the voltage applied to the charge supply member is set to a magnitude that reverses the electrostatic polarity of the sheet surfaces, and the voltage is applied to every other sheet. In this case, the surfaces facing each other of overlapping sheets are charged with the same polarity, thus reducing the sticking of the sheets to each other due to electrostatic forces.

However, a sheet subjected to the charge adjustment process by the above-described charge adjustment apparatus has a large amount of charge and, thus tends to stick to the conveyance path, potentially causing a conveyance failure. To reduce sheet conveyance failure, the non-contact static elimination unit 58 may be disposed downstream of a roller that adjusts the charge of a sheet in the charge adjustment apparatus, and the static electricity of the sheet may be eliminated by the non-contact static elimination unit 58. In this case, the user's printing operation can be interrupted less frequently, and the user's operation efficiency can be improved by performing detection of the need for maintenance of the non-contact static elimination unit when the image forming apparatus transitions from the first state to the second state in which power consumption is lower than in the first state.

While the above embodiments have been described with reference to a case in which the image forming system is applied to the electrophotographic image forming system 300, the image forming system may be applied to an inkjet image forming system.

According to the present disclosure, it is possible to implement a static elimination apparatus and an image forming system that reduce the frequency of interruptions to printing operations caused by maintenance of a non-contact static elimination unit.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims priority to Japanese Patent Application No. 2024-220511, which was filed on Dec. 17, 2024 and which is hereby incorporated by reference herein in its entirety.

What is claimed is:

1. A static elimination apparatus configured to be connected to an image forming apparatus including an image forming unit configured to form an image on a sheet, the static elimination apparatus comprising:

a non-contact static elimination unit including an electrode portion configured to generate ions, wherein the non-contact static elimination unit is configured to perform non-contact static-electricity elimination on the sheet bearing an image formed by the image forming unit; and a control unit configured to perform a detection process for detecting whether maintenance of the electrode portion is needed, wherein the control unit performs the detection process in response to an instruction to transition the image forming apparatus from a first state to a second state in which power consumption is lower than in the first state.

2. The static elimination apparatus according to claim 1, further comprising:

a display unit configured to display a result of the detection process, wherein in a case where it is determined by the detection process that maintenance of the electrode portion is needed, the display unit presents information indicating that maintenance of the electrode portion is needed.

3. The static elimination apparatus according to claim 2, wherein in a case where it is determined by the detection process that maintenance of the electrode portion is needed, the display unit presents the information indicating that maintenance of the electrode portion is needed when the image forming apparatus transitions from the second state to the first state.

4. The static elimination apparatus according to claim 1, further comprising:

a switch configured to turn on and off power to the image forming apparatus, wherein the control unit performs the detection process when the switch transitions from on to off.

5. The static elimination apparatus according to claim 1, wherein the second state is a sleep mode, wherein the static elimination apparatus comprises a key configured to select the second state to have priority, and wherein the control unit performs the detection process in response to the key being pressed.

6. The static elimination apparatus according to claim 1, wherein the second state is a sleep mode, wherein the static elimination apparatus comprises a key configured to select the second state to have priority, and wherein the control unit performs the detection process when the second state is selected as a priority by the key and when no user operation is performed for a predetermined period of time following an end of a job.

7. The static elimination apparatus according to claim 1, wherein in a case where the detection process was performed after completion of a last job prior to the transition from the first state to the second state, the control unit does not perform the detection process.

8. The static elimination apparatus according to claim 1, wherein the control unit controls the image forming unit to form the image on the sheet, controls the non-contact static elimination unit to execute a job that eliminates static electricity on the sheet, and performs the detection process, wherein if an accumulated operating time, obtained by aggregating an operating time of the non-contact static elimination unit when executing the job, is greater than a first threshold value, the control unit performs the detection process after completion of the job, and wherein upon receipt of the instruction to transition the image forming apparatus from the first state to the second state, the control unit performs the detection process if the accumulated operating time is greater than a second threshold value that is less than the first threshold value.

9. The static elimination apparatus according to claim 8, wherein the second threshold value is less than or equal to two-thirds of the first threshold value.

10. The static elimination apparatus according to claim 1, wherein when the image forming apparatus transitions from the first state to the second state, the control unit performs the detection process if either a cooling operation that reduces a temperature of the image forming apparatus or an adjustment operation to adjust conditions of image formation is being performed.

11. The static elimination apparatus according to claim 1, wherein the control unit controls the image forming unit to form the image on the sheet, controls the non-contact static elimination unit to execute a job that eliminates static electricity on the sheet, and performs the detection process to detect whether maintenance of the electrode portion is needed, wherein in a case where an accumulated number of sheets obtained by aggregating a number of sheets that have passed through the non-contact static elimination unit while executing the job is greater than a first threshold value, the control unit performs the detection process after completion of the job, and wherein upon receipt of the instruction to transition the image forming apparatus from the first state to the second state, the control unit performs the detection process if the accumulated number of sheets is greater than a second threshold value that is less than the first threshold value.

12. The static elimination apparatus according to claim 1, wherein the detection process is performed between receipt of the instruction to transition the image forming apparatus from the first state to the second state and completion of the transition to the second state.

13. An image forming system comprising:

the static elimination apparatus according to claim 1; and an image forming apparatus.

14. An image forming system comprising:

an image forming unit configured to form an image on a sheet;

a non-contact static elimination unit including an electrode portion configured to generate ions, wherein the non-contact static elimination unit is configured to perform non-contact static-electricity elimination on the sheet bearing an image formed by the image forming unit; and a control unit configured to perform a detection process for detecting whether maintenance of the electrode portion is needed, wherein the control unit performs the detection process in response to an instruction to transition the image forming system from a first state to a second state in which power consumption is lower than in the first state.

* * * * *